Patented Apr. 22, 1924.

1,491,380

UNITED STATES PATENT OFFICE.

ARTHUR JOHN CLARK, OF WALTON-ON-THAMES, ENGLAND, ASSIGNOR TO GLASGOW & LONDON REFINING COMPANY LIMITED, OF MOORGATE, LONDON, ENGLAND, A CORPORATION OF GREAT BRITAIN.

COMPOUND FOR USE IN CONNECTION WITH BAKING PROCESSES AND THE LIKE.

No Drawing.    Application filed June 22, 1921. Serial No. 479,652.

*To all whom it may concern:*

Be it known that I, ARTHUR JOHN CLARK, residing at Walton-on-Thames, Surrey, England, a subject of the King of Great Britain and Ireland, have invented certain new and useful Improvements in or Relating to Compounds for Use in Connection with Baking Processes and the like (for which I have filed applications in England May 19, 1920, Patent No. 168,362, and in Germany January 29, 1921), of which the following is a specification.

This invention relates to the preparation of compounds containing fats and oils in intimate mixture as an emulsion with water or aqueous liquids for use in connection with baking processes and the like. The object of this invention is to provide an improved compound of this kind, adapted to act both as a shortening and as a lubricant, and is intended to replace a large proportion of the fats generally used for the purpose by a mucilage which, being hygroscopic, tends to maintain the baked material in a fresh condition.

A product is prepared in accordance with this invention by taking a mixture of edible fats and oils in the proportion of (about) 20 to 40 parts of fats to 10 to 30 parts of oils and emulsifying with from five to sixty parts of a mucilage formed of edible hemi-cellulose. The proportion of fats, oils and mucilage is variable according to the nature of the raw materials to be compounded and the particular use for which the product is required.

The fats and oils and mucilage are emulsified by stirring together at a temperature of 80° to 100°, and allowed to cool while being stirred by mechanical or other means, the resulting product having a texture somewhat similar to soft lard. Boric acid, borax, salicylic acid or other preservatives having non-toxic properties calculated to inhibit changes due to growth of organisms may be added.

In use I have found that products prepared in accordance with this invention compounded of 30 parts of fats 20 parts of oils with 50 parts of mucilage produce excellent results especially in connection with the baking of cakes, pastries and biscuits, although they can be used in baking generally where an admixture of fats and oils is an advantage. The proportions may be varied as previously stated.

The mucilage mentioned above may advantageously be prepared from certain edible algæ such as *Chondrous crispus* or from certain seeds such as those of *Ceratonia siliqua*.

What I claim and desire to secure by Letters Patent is:—

1. A process for the preparation of a baking compound, which consists in thoroughly emulsifying in a mixing machine, a mixture of edible fats and oils heated to a temperature of 80° to 100° C. and adding to said mixture mucilage obtained by boiling an edible hemi-cellulose in water for about half an hour, straining the resulting liquid, and allowing it to cool and jellify.

2. A preparation consisting of edible fats and oils and a mucilage formed of edible hemi-cellulose.

3. The process of preparing a baking compound, which consists in heating a mixture of fats and oils while stirring the same, boiling an edible hemi-cellulose in water, straining the resulting liquid and allowing it to cool thereby to form a jelly, adding said jelly to the mixture of fats and oils, and stirring said mixture thereby to emulsify the same.

4. A preparation consisting of 20 to 40 parts of fats, 10 to 30 parts of oils, and 5 to 60 parts of an edible hemi-cellulose.

In testimony whereof I have signed my name to this specification.

ARTHUR JOHN CLARK.